United States Patent Office 3,234,223
Patented Feb. 8, 1966

3,234,223
PREPARATION OF 7-AMINO-CEPHALOSPORANIC ACID AND DERIVATIVES
Bruno Fechtig and Hans Bickel, Binningen, Ernst Vischer, Basel, Albert Eschenmoser, Zollikon, Zurich, and Jakob Schreiber, Zurich, Switzerland, assignors to Ciba Corporation, New York, N.Y., a corporation of Delaware
No Drawing. Filed Feb. 13, 1963, Ser. No. 258,144
Claims priority, application Switzerland, Feb. 16, 1962, 1,907/62
9 Claims. (Cl. 260—243)

The present invention provides a new process for the manufacture of 7-amino-cephalosporanic acid and its 7-acyl derivatives, wherein an imino ether of a 7-acyl-aminocephalosporanic acid or of a functional derivative thereof, more especially Cephalosporin C or a derivative thereof is hydrolysed and, if desired, the resulting 7-aminocephalosporanic acid is converted into an $N_7$-acyl derivative thereof. The free amino group of the side-chain is protected during the reaction, for example by a lower alkyl, aryl or acyl radical, preferably by a radical which diminishes the basicity of the amino group. An aryl radical is, for example, a naphthyl or phenyl radical which is unsubstituted or substituted by a nitro, cyano or sulfoxyl group, a halogen atom, a carbonamido, carbo-lower alkyl or carbo-lower alkoxy group, such as the 2:4-dinitrophenyl, 2:4:6-trinitrophenyl, 2:4-dinitro-6-methoxyphenyl, 4-cyanophenyl or 4-carbomethoxyphenyl radical. An acyl radical is more especially a lower alkanoyl radical, for example acetyl, propionyl, butryl, also an aroyl radical such as benzoyl or benzoyl substituted by a nitro, cyano, sulfoxyl group, a halogen atom, a lower alkyl or lower alkoxy group; also an aryl lower alkoyl radical, for example phenylacetyl; the carbobenzoxy and tertiary butyloxycarbonyl radical; the benzenesulfonyl and toluenesulfonyl radical. The carboxyl groups may also be protected, for example by esterification, particularly with alcohols or phenols that are easy to hydrolyse under alkaline conditions, for example with alcohols or phenols containing an electron-attracting substituent such as the nitro group, the cyano or sulfoxyl or esterified carboxyl groups, such as cyanomethyl alcohol or para-nitrophenol. The esterification may also be carried out with advantage with alcohols capable of elimination by hydrogenolysis, for example with a benzyl alcohol.

Starting, for example, from Cephalosporin C-imino ethers the reaction may be represented by the following diagram:

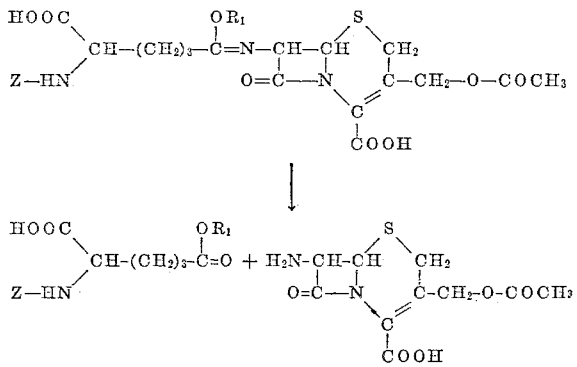

in which Z represents an above-mentioned amino protective group, for example 2:4-dinitrophenyl, and $R_1$ an alkyl or aralkyl radical, more especially a lower alkyl radical, such as methyl, ethyl or propyl, or the benzyl radical.

The hydrolysis is performed in known manner with an acidic or basic agent. As acidic agents there are preferably used mineral acids, for example hydrochloric, sulfuric, phosphoric or fluoboric acid, or strong organic acids such as trifluoracetic or para-toluenesulfonic acid. Preferred basic agents are salts of weak acids with alkali metals or alkaline earth metals.

The 7-amino-cephalosporanic acid can be isolated as such; alternatively, the reaction product may be substituted with any desired acyl group at the 7-amino group. For the acylation there are particularly suitable radicals of aliphatic, cycloaliphatic, araliphatic, aromatic or heterocyclic carboxylic acids or carbonic acid derivatives. The acyl group is, for example, 2:6-dimethoxy-benzoyl, 2-carboxy-benzoyl, 2-(2'-carboxyphenyl)-benzoyl, 5-methyl-3-phenyl-4-isoxazolylcarbonyl, phenylacetyl, para-aminophenyl-acetyl, phenylglycyl, β-phenylalanyl, α-halogenyl-α-phenylacetyl, α-phenoxy-α-phenylacetyl, phenoxyacetyl, α-alkyl-α-phenoxyacetyl, α-(para-nitrophenoxy)-propionyl, α-phenoxy-α-halogeno-acetyl, phenylaminocarbonyl, phenylamino-acetyl, 2:4-dichlorophenyl-mercapto-acetyl, β-benzyl-mercapto-propionyl, phenylmercapto-acetyl, 4-chlorophenyl-mercapto-acetyl, 2 - methoxy - 5-methylphenyl-mercapto-acetyl, 2:4-dichlorophenyl- mercapto-acetyl, β-benzyl-mercapto-propionyl, 2:4-dimethoxy-3-quinoloyl, α:α-diphenyl-α-methallyl-acetyl, 4:6-dimethyl-2-chloronicotinoyl, 2-methoxy-4:6-dimethylnicotinoyl, 2:6-dimethoxy-4 - phenylnicotinoyl, 2:4:6 - trimethoxy-nicotinoyl, 2:4-dimethoxy-nicotinoyl, 2:4:6-trichloro-nicotinoyl, 2-methoxy-5-methyl-phenyl-mercapto-acetyl or 2-methoxy-naphthalene-1-carbonyl.

The acylation is performed in the usual manner, for example with the aid of the acid halides or anhydrides, advantageously in the presence of diluents, such as halogenated hydrocarbons, for example methylene chloride, ethylene chloride or chloroform, acetonitrile, ether, dioxane, tetrahydrofuran or the like, and of basic condensing agents such, for example, as alkali metal carbonates or bicarbonates, organic bases such as tertiary amines for example trialkylamines, pyridine, picoline, collidine, lutidine, dimethylaniline or the like. Alternatively, the acylation may be performed with the free acid in the presence of a condensing agent, for example of a carbodiimide.

The imino ethers used as starting material can be prepared, for example, with the aid of a trialkyl oxonium fluoborate.

The imino ethers need not be isolated but may be formed in the course of the reaction and reacted as they are.

The invention includes also any variant of the present process in which an intermediate obtained at any stage is used as starting material and any remaining steps are carried out, or the process is discontinued at any stage thereof.

The following examples illustrate the invention.

EXAMPLE 1

A solution of 2.91 grams ($5.10^{-3}$ mols) of N-2:4-dinitrophenyl-Cephalosporin C in 40 ml. of dioxane is mixed with 30 ml. of ethylene chloride and at 0° C. with 28.5 ml. of a solution of 10% strength of triethyl oxonium fluoborate ($15.10^{-3}$ mols) in ethylene chloride, and the mixture is kept for 2 hours at 0° C. and then for 2 hours at 22° C. in the dark, then concentrated to a small volume under a vacuum of 0.1 mm. Hg, mixed with 75 ml. of methanol+water (2:1) and kept for 18 hours at 2° C. The hydrolysis mixture is then diluted with 50 ml. of water and freed from the organic solvent at pH=5 under vacuum. The solution is covered with ethyl acetate, adjusted with ortho-phosphoric acid of 85% strength to pH=2.0 and extracted with ethyl acetate. The ethyl acetate extracts are washed with phosphoric acid of 1% strength, dried over sodium sulfate and evaporated to yield 2.69 grams of Extract *a* which contains, in addition to the split-off side chain, according to the plate test and thin-layer chromatography still some starting material (see Tables 1 and 2).

The aqueous phase (=Extract $b$; characterised by plate test, paper-chromatography and paper electrophoresis; see Tables 1, 3 and 4) which contains free or esterified 7-amino-cephalosporanic acid is concentrated at pH=6 under 0.1 mm. Hg pressure, adjusted with N-sodium bicarbonate solution to pH=7.5 and mixed with an equal volume (150 ml.) of acetone. The solution is cooled to 0° C. and, with continued ice cooling, 10 ml. of 10% phenylacetyl chloride solution ($7.5.10^{-3}$ mols) in acetone are slowly stirred in while maintaining the pH value constant by adding N-sodium bicarbonate solution. On completion of this addition the batch is stirred for ½ hour at 0° C. and then for ½ hour at 20° C. The acetone is evaporated under vacuum and the residue is extracted at pH=7.5 with ethyl acetate. The extracts are washed with water and dried and yield 35 mg. of Extract $c$, which is characterized by the plate test, thin-layer chromatography and paper-electrophoresis (see Tables 1, 2 and 4). Its activity is probably due to the presence of 7-(phenylacetylamino)-cephalosporanic acid ester.

The aqueous phase is adjusted with phosphoric acid of 85% strength to pH=3.3, and the excess phenylacetic acid is extracted with benzene. Yield: 859 mg. of Extract $d$ (plate test, see Table 1).

The aqueous phase is further acidified with phosphoric acid to establish a pH=2.5, saturated with sodium chloride and extracted with ethyl acetate. After washing with sodium chloride solution, drying and evaporation there are obtained 223 mg. of 7-(phenylacetylamino)-cephalosporanic acid (=Extract $e$; characterized by plate test, thin-layer chromatography, paper-chromatography and paper-electrophoresis; see Tables 1 to 4). The remaining aqueous phase (=Extract $f$) contains only little residual material as revealed by the plate test (see Table 1).

*Table 1*

[Plate test demonstrating the inhibition of the growth of micro-organisms by Extracts $a$ to $f$ (inhibition zones in mm. of 1% solutions on 6 mm. paper roundels)]

|  | Staphylococcus aureus towards penicillin G | | Bacillus subtilis |
|---|---|---|---|
|  | Sensitive | Resistant |  |
| N-2:4-dinitrophenyl-Cephalosporin C | 24 | 19 | 34 |
| Extract $a$ | 20 | 15.5 | 30 |
| Extract $b$ | 0 | 0 | 0 |
| Extract $b'$ | 18.5 | 11 | 27 |
| Extract $c$ | 15.5 | 9 | 18.5 |
| Extract $d$ | 7 | 0 | 11 |
| Extract $e$ | 29 | 21 | 51.5 |
| Extract $f$ | 0 | 0 | 0 |
| Extract $f'$ | 7.5 | 0 | 16 |

Extracts $b'$ and $f'$ have been phenylacetylated on a microscale, that is to say the extracts applied in the form of solutions to paper roundels have been sprinkled successively with 8% pyridine in acetone+water (1:1), with 2% phenylacetyl chloride in acetone, and again with the 8% pyridine solution.

*Table 2*

[Rf-values in the thin-layer silica gel chromatogram (system n-butanol:glacial acetic acid (10:1) saturated with water)]

|  | Stains of natural yellow color | Stains identified with iodized starch [1] |
|---|---|---|
| N-2:4-dinitrophenyl-Cephalosporin C | 0.20 | 0.20 |
| Extract $a$ | 0.00; 0.20; 0.31; 0.47; 0.60. | 0.00; 0.20 |
| Extract $c$ |  | 0.71 |
| Extract $e$ |  | 0.32 |

[1] Reagent according to R. Thomas, Nature 191, page 1161 (1961).

*Table 3*

[Rf-values in the paper-chromatogram (system n-butanol:glacial acetic acid (10:1) saturated with water)]

|  | Stains of natural yellow color (E) or developed with ninhydrin (N) | Bioautogram with Staphylococcus aureus |
|---|---|---|
| N-2:4-dinitrophenyl-Cephalosporin C | 0.73 (E) | 0.73 |
| Extract $b$ | 0.13 (N) grey-orange. |  |
| Extract $b'$ |  | 0.13 |
| Extract $e$ |  | 0.80 |

Extract $b'$ signifies that Extract $b$, chromatographically developed with the eluant, has been phenylacetylated on the paper before the bioautography. Sprinkling with reagent was carried out as shown underneath Table 1.

*Table 4. High-voltage paper-electrophoresis*

[2000 volt, 1 hour, N-acetic acid adjusted with pyridine to pH=4.5. Distances travelled in cm. towards the anode are marked +, those towards the cathode are marked −]

```
                                              Cm.
Cephalosporin C _____ +3.6
6-aminopenicillanic acid _____ +1.1
Extract $b$ _____ +1.6
Extract $c$ _____ −0.9
Extract $e$ _____ +3.2
```

Stains after phenylacetylation bioautographed with Staphylococcus aureus.

EXAMPLE 2

381 mg. ($0.5.10^{-3}$ mols) of N-2:4-dinitrophenyl-Cephalosporin C dibenzyl ester are dissolved in 10 ml. of ethylenechloride, treated with 1.5 ml. of a solution of 10% strength of triethyl oxonium fluoborate ($0.79.10^{-3}$ mols) in ethylene chloride and allowed to stand for 3 hours at 22° C. 1 ml. of pyridine is then added to the reaction mixture which is evaporated to dryness in vacuo. The residue is taken up in a mixture of 50 ml. of dioxane and 30 ml. of an aqueous solution of phosphoric acid of 5% strength and allowed to stand for 4 hours at 22° C. for the purpose of hydrolysing the imino ether. The reaction mixture is diluted with water and the dioxane evaporated in vacuo and the remaining aqueous phase is extracted with a mixture of chloroform and ether (1:3) and, at a pH value of 8 (adjusted with tripotassium phosphate), with ethyl acetate. The ethyl acetate extract is dried over sodium sulfate and evaporated in vacuo to yield 7-aminocephalosporanic acid benzyl ester. Thin layer chromatogram on silica gel:

System benzene+acetone (1:1): Rf=0.69
System cyclohexane:ethyl acetate (1:1): Rf=0.14.
After development with ninhydrin+collidine—yellow stain; with iodized starch (cf. Example 1)—colorless stain.

The product may be hydrogenated in a solution of glacial acetic acid in the presence of three times the quantity 362 mg. ($1.0.10^{-3}$ mols) of 7-aminocephalosporanic acid.

Thin layer chromatogram on silica gel in the system n-butanol:pyridine:glacial acetic acid:water (30:20:6:24): Rf=0.39; in the same system the Rf-value of 6-aminopenicillanic acid=0.46, that of Cephalosporin C=0.29.

The product may also be acylated first and then converted by hydrogenation into a free, antibiotically active 7-acylaminocephalosporanic acid.

362 mg. ($1.0.10^{-3}$ mols) of 7-aminocephalosporanic acid benzyl ester are dissolved in 30 ml. of methylene chloride and treated at 0° C. with 1 ml. of pyridine and 0.23 ml. (about $1.5.10^{-3}$ mols) of phenylacetyl chloride and allowed to react for ½ hour at 0° C. and then ½ hour at 22° C. The reaction mixture is evaporated under a pressure of 0.1 mm. of mercury, the residue taken up in chloroform:ether (1:3) and the organic phase washed with 2% aqueous phosphoric acid, N-sodium bicarbonate and saturated sodium chloride solution. The organic phase is dried over sodium sulfate and evaporated to yield 7-phenylacetylcephalosporanic acid benzyl ester.

Thin layer chromatogram on silica gel in the system benzene-acetone (8:2): $R_f=0.52$. The ester is converted into 7-phenylacetylamino-cephalosporanic acid by hydrogenation in glacial acetic acid in the presence of three times the quantity of palladium carbon.

We claim:

1. A process for the manufacture of a 7-amino-cephalosporanic acid of the Formula I

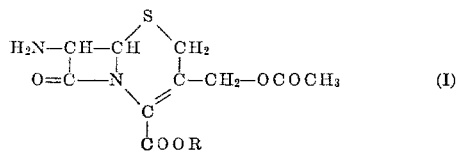

in which OR stands for a member selected from the group consisting of the hydroxy group and an easily hydrolyzable alcoholic ester protective group, wherein a member selected from the group consisting of a lower alkyl imidoether of Cephalosporin C and its diester of the Formula II

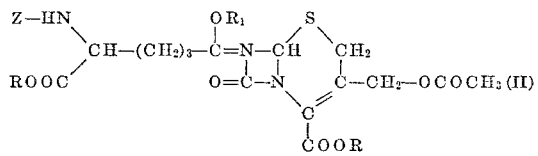

in which $R_1$ stands for lower alkyl, Z for a blocking agent selected from the group consisting of lower alkyl, aryl and acyl, and OR has the meaning given above is treated with a hydrolysing agent selected from the group consisting of an aqueous acidic and an aqueous alkaline agent.

2. The process of claim 1 wherein, in the resulting-amino-cephalosporanic acid of the Formula I, the alcoholic ester group OR is converted to the free acid by hydrolysis.

3. A lower alkyl imidoester of Cephalosporin C, whose free amino group is protected by a substituent selected from the group consisting of lower alkyl, phenyl, naphthyl, phenyl substituted by a member selected from the group consisting of nitro, cyano, sulfoxy, halo, carbonamido, carbo-lower alkyl and carbo-lower alkoxy, naphthyl substituted by a member selected from the group consisting of nitro, cyano, sulfoxy, halo, carbonamido, carbo-lower alkyl and carbo-lower alkoxy, lower alkanoyl, lower alkanoyl substituted by a member selected from the group consisting of nitro, cyano, sulfoxy, halo, lower alkyl and lower alkoxy, phenyl-lower alkanoyl, carbobenzoxy, tertiary butyloxycarbonyl, benzenesulfonyl and toluenesulfonyl.

4. A lower alkyl imidoester of a Cephalosporin C-benzyl ester, whose free amino group is protected by a substituent selected from the group consisting of lower alkyl, phenyl, naphthyl, phenyl substituted by a member selected from the group consisting of nitro, cyano, sulfoxy, halo, carbonamido, carbo-lower alkyl and carbo-lower alkoxy, naphthyl substituted by a member selected from the group consisting of nitro, cyano, sulfoxy, halo, carbonamido, carbo-lower alkyl and carbo-lower alkoxy, lower alkanoyl, lower alkanoyl substituted by a member selected from the group consisting of nitro, cyano, sulfoxy, halo, lower alkyl and lower alkoxy, phenyl-lower alkanoyl, carbobenzoxy, tertiary butyloxycarbonyl, benzenesulfonyl and toluenesulfonyl, said ester being derived from a member selected from the group consisting of cyanomethanol, phenol and phenol substituted by a member selected from the group consisting of nitro, cyano and sulfoxy.

5. A lower alkyl imidoester of Cephalosporin C-dibenzyl ester, whose free amino group is protected by a substituent selected from the group consisting of lower alkyl, phenyl, naphthyl, phenyl substituted by a member selected from the group consisting of nitro, cyano, sulfoxy, halo, carbonamido, carbo-lower alkyl and carbo-lower alkoxy, naphthyl substituted by a member selected from the group consisting of nitro, cyano, sulfoxy, halo, carbonamido, carbo-lower alkyl and carbo-lower alkoxy, lower alkanoyl, lower alkanoyl substituted by a member selected from the group consisting of nitro, cyano, sulfoxy, halo, lower alkyl and lower alkoxy, phenyl-lower alkanoyl, carbobenzoxy, tertiary butyloxycarbonyl, benzenesulfonyl and toluenesulfonyl.

6. A process as claimed in claim 1, wherein an imino ether is prepared by reacting Cephalosporic C whole 7-amino group is blocked by a substituent selected from the group consisting of lower alkyl, aryl and acyl with a tri-lower alkyloxonium fluoborate, and treating the resulting lower alkyl imidoester with a hydrolysing agent selected from the group consisting of an aqueous acid and an aqueous alkaline agent.

7. A process as claimed in claim 1, wherein an acidic agent is used for hydrolysis.

8. The ethylimido-ester of N-2:4-dinitrophenyl-Cephalosporin C.

9. The ethylimido ester of N-2:4-dinitrophenyl-Cephalosporin C-dibenzyl ester.

References Cited by the Examiner

UNITED STATES PATENTS

| | | | |
|---|---|---|---|
| 3,049,541 | 8/1962 | Abraham et al. | 260—243 |
| 3,124,576 | 3/1964 | Stedman | 260—243 |
| 3,157,648 | 11/1964 | Collins | 260—243 |

OTHER REFERENCES

Biochemical Jour., vol. 81, pages 591–596 (1961).

NICHOLAS S. RIZZO, *Primary Examiner.*